US006782624B2

(12) United States Patent
Marsh et al.

(10) Patent No.: US 6,782,624 B2
(45) Date of Patent: Aug. 31, 2004

(54) MODULAR BARRIER SYSTEM FOR SATISFYING NEEDS UNIQUE TO A SPECIFIC USER

(75) Inventors: Charles P. Marsh, Urbana, IL (US); Charles C. Lozar, Champaign, IL (US); Brian Temple, Los Alamos, NM (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 120 days.

(21) Appl. No.: 10/096,922

(22) Filed: Mar. 14, 2002

(65) Prior Publication Data

US 2003/0183814 A1 Oct. 2, 2003

(51) Int. Cl.[7] .......................... B23P 17/00; B23P 21/00

(52) U.S. Cl. .................. 29/897.32; 29/469; 29/525.01; 29/530; 256/13.1; 256/11; 256/28; 404/6

(58) Field of Search ............................ 29/897.32, 469, 29/525.01, 525.08, 530; 256/13.1, 27, 28, 24, 11, 12; 404/6; 340/566, 541

(56) References Cited

U.S. PATENT DOCUMENTS

| | | | | | |
|---|---|---|---|---|---|
| 364,175 | A | | 5/1887 | Hurd | |
| 1,937,781 | A | * | 12/1933 | Patton | 405/285 |
| 3,807,699 | A | * | 4/1974 | France | 256/13.1 |
| 4,373,955 | A | | 2/1983 | Bouchard et al. | |
| 4,423,854 | A | * | 1/1984 | Cobb et al. | 256/13.1 |
| 4,474,503 | A | * | 10/1984 | Booth et al. | 404/6 |
| 4,553,875 | A | * | 11/1985 | Casey | 404/6 |
| 4,803,107 | A | | 2/1989 | Knowles | |
| 4,978,245 | A | * | 12/1990 | White | 404/6 |
| 5,054,954 | A | * | 10/1991 | Cobb et al. | 404/6 |
| 5,149,061 | A | * | 9/1992 | Borgnini | 256/13.1 |
| 5,246,305 | A | * | 9/1993 | Peek | 404/6 |
| 5,461,364 | A | * | 10/1995 | Sanford et al. | 256/11 |
| 5,531,540 | A | * | 7/1996 | Wasserstrom et al. | 404/6 |
| 6,086,285 | A | | 7/2000 | Christensen | |
| 6,669,402 | B1 | * | 12/2003 | Davis et al. | 404/6 |

* cited by examiner

*Primary Examiner*—David P. Bryant
(74) *Attorney, Agent, or Firm*—Earl H. Baugher, Jr.

(57) ABSTRACT

A method of deploying a system for controlling access and egress. In a preferred embodiment, the user's requirements are considered in providing a properly scaled barrier for such varied uses as security, safety, order, privacy, and discipline. In one embodiment, pre-manufactured panels and connectors are delivered to a site that has been properly prepared for installation of the system. Local materials may be used for the panels in some cases. The panels and connectors may be assembled quickly by unskilled labor and, in some embodiments, the barrier just as quickly dismantled or repaired as necessary. One method of the present invention provides for deploying a temporary or emergency solution to access control. Another method deploys a system that may be used in a residential setting, providing storage in some installations. Accessories for enhancing effectiveness may be installed on or within barriers deployed using a method of the present invention.

6 Claims, 14 Drawing Sheets

MODULAR BARRIER SYSTEM FOR SATISFYING NEEDS UNIQUE TO A SPECIFIC USER

STATEMENT REGARDING FEDERALLY SPONSORED RESEARCH OR DEVELOPMENT

Under paragraph 1(a) of Executive Order 10096, the conditions under which this invention was made entitle the Government of the United States, as represented by the Secretary of the Army, to the entire right, title and interest in any patent granted thereon by the United States. This and related patents are available for licensing. Please contact Bea Shahin at 217 373-7234 or Phillip Stewart at 601 634-4113.

BACKGROUND

A requirement for a security barrier was announced by the US Border Patrol. They needed a barrier able to be built from readily available materials. Further, it must be easy to build (not requiring skilled labor) and modular to adapt to varying local conditions and changing scenarios. A preferred embodiment of the present invention is designed for use under various applications. Thus, initial design criteria were based upon the needs of the U.S. Border Patrol for a barrier to use under a variety of conditions to control border access. Criteria included:

- It must be solid to hamper the passing of drugs across it and prevent penetration of bullets to the other side.
- It must be robust against degradation of its function while maintaining its structural integrity. Degradation sources include scaling, burrowing under, ramming by vehicles, cutting, and repeated hammering and chipping.
- It must inhibit immediate traversal to facilitate apprehension of the transgressor.
- It must be maintained at relatively low cost with maintenance easy to perform quickly in order to minimize exposure of maintenance personnel.
- It must be usable in all types of geography, including hilly and rough terrain.
- It must "work well and last a long time" irrespective of the type and frequency of repairs.
- It must minimize the danger to the Border Patrol and other personnel working at the border.

Because the Border Patrol cannot control what is done on the "foreign side" of the barrier, design criteria must account for this limitation. Of course, such a barrier might be adapted for other uses, especially those for which less stringent requirements may exist.

Previous barrier designs used to aid the Border Patrol have failed to control access across the border. Various designs of wire mesh fences, commonly used in prisons and schools, have been easily destroyed by transgressors. A barrier constructed from surplus temporary airfield landing mat is currently installed between San Diego, Calif. and Tijuana, Mexico. On the southern border with Mexico, fencing is installed only near population centers. Hence, only as many as 98 Km (60 miles) of the more than 3100 Km (1900 miles) is fenced. The excess steel landing mat will be exhausted long before any significant amount of border is fenced. The steel landing mat barrier is difficult to maintain and is easily circumvented by scaling or digging under the fence, sawing, use of a cutting torch, ramming, etc.

A bollard fence design has been installed as both a primary and secondary barrier (a second barrier located north of the primary barrier) at the same location. This bollard fence is a staggered line of vertically oriented concrete posts spaced at 10–12.7 cm (4–5 inches) and embedded in concrete. The posts are vulnerable to chipping, require concrete forms that must be installed by skilled contractors, and may be vandalized easily while curing. Transgressors can both see through and reach through the bollards, allowing them to pass drugs and even shoot through them. Proposals to enclose the bollards in steel tubes may make them less vulnerable to attack. This still allows transgressors to reach through the fence and still requires skilled contractors to construct and repair them.

In selected areas there are also impediments at low heights for deterring vehicle traffic. A fence has been installed between El Paso, Tex. and Mexico that is aesthetically appealing, but not resistant to vandalism. The fence is constructed of lightweight panels a few inches thick, mounted on support poles a few inches in diameter. Attacks by blunt instruments can easily create gaping holes in the fence. Ramming by a vehicle can severely damage the fence. In addition, resultant openings allow transgressors to transfer illicit items.

Existing designs fail to meet needs of the Border Patrol at a reasonable cost over their life cycle. A preferred embodiment of the present invention provides a cost effective solid barrier to human and vehicular intrusion that meets all the requirements of the Border Patrol and similarly situated agencies and organizations and may be adapted for commercial or consumer use.

SUMMARY

An embodiment of the present invention provides a method of deployment for an economical multi-purpose barrier in applications such as a primary barrier at an international border, security for military installations, and general security, safety or privacy applications in police, industrial, recreational, commercial, environmental, or residential applications. In one embodiment, the method provides a barrier that is solid and highly resistant to damage. In an embodiment of the present invention the method provides a barrier that combines the properties of a high strength panel, such as steel or a high strength polymer, and a masonry wall, such as concrete or pumice-crete. The exterior of this barrier is comprised of interlocking panels that serve as:

- armor against attack (both above and below grade);
- enclosures for in-fill material, such as fill dirt, sand, or concrete; and
- a mechanism for transferring an external force applied against any individual section to neighboring sections.

In this barrier, the exterior panels have interlocking joints that resist physical intrusion without the addition of in-fill material. The addition of in-fill material provides additional support for the connections, thus providing additional protection against attack. Besides providing additional mass against ramming, solid in-fill also provides a formidable barrier against intrusion should exterior panels be removed or damaged. The external panels may be embedded in the ground, providing significant resistance to ramming, tipping, or burrowing beneath the barrier. Additionally, the barrier may be anchored internally to resist tipping; forces applied near its top.

A barrier deployed via a method of the present invention is installed quickly and easily. Further, should the need arise, it may be repaired without the need of special tools, heavy equipment, or concrete forms. In one embodiment of the present invention, a trench of suitable dimensions, such as approximately 0.9 m (3 ft) deep by 1.6 m (5 ft) wide, is dug the length of the section to be installed or the length of a reasonable portion of the entire boundary desired to be protected. After emplacing and connecting panel sections in the trench, a suitable in-fill material, such as concrete, is placed between the panels. To hold a cementitious mixture until setup, a temporary removable form may be used at one or both ends of a suitable length comprising one or more sections of the barrier. This form may be used with suitable soft material and left in place to comprise an expansion joint for the concrete. Deterrents may be affixed to the top of a completed section and secured on the "protected" side of the barrier by suitable means, such as welding, epoxy, mechanical fasteners, or combinations thereof. Alternatively, pre-connected ("protected" side and "transgressor" side) sections can be dropped into place in a trench as needed, the trench backfilled quickly, and the resultant barrier serve the same purpose as an "in-filled" section, at least temporarily.

Advantages of a preferred embodiment of the present invention that provides maximum resistance to an aggressive transgressor include:

- prevents ready ingress by surface or sub-surface based transgressor;
- requires greater effort and more time to breach than conventional designs;
- makes penetration by a welding torch, chipping, cutting, or other mechanical means difficult and time-consuming;
- provides no purchase for a person to breach the top from either direction because of its smooth barrier walls extending high above the ground at a steep angle since there are no external connections needed to be made when installing the panels;
- prevents transgressors from using it to survey an area because of the narrow width at its top together with optional detectors and deterrents that may be placed at its top;
- optional deterrents may be used based on specific needs, locations, times and expected transgressors;
- optional deterrents affixed to the top of a high version require a transgressor to work at an unsafe height at a risk of serious injury from a fall;
- detectors and deterrents may be repaired on the protected side of the barrier below its maximum height, thus, shielding the workers from potential transgressors;
- detectors and deterrents may not require urgent repair since the height, shape and texture of the barrier makes breaching more difficult than conventional systems;
- repairs can be postponed since defeating the barrier's purpose requires both panels and the in-fill material to be removed or damaged;
- use of interlocking high strength panels as permanent forms for the in-fill material and as a structural member of the barrier facilitates both rapid installation and rapid repair of the barrier;
- may be installed over existing barriers, resulting in a barrier that uses existing structure as part of its "in-fill" material for providing added strength without incurring time and expense to remove the existing system; and
- replacement panels may be welded or epoxied over any gaps in the barrier caused by major damage from sophisticated transgressors and new in-fill material quickly added to re-establish barrier integrity.

Further, all embodiments share the following advantages:

- can be assembled easily by workers needing no special skills;
- low maintenance costs;
- increased flexibility for use so that a less durable design may be applied to commercial, environmental, industrial or even residential use;
- high reliability;
- simplified design of alternate configurations to include mobile or temporary installations;
- ability to use different modules at the top to meet specific requirements as they arise; and
- ready upgradability to state-of-the-art modifications.

The design of a preferred embodiment of the present invention makes it adaptable in applications where conventional barriers cannot be used effectively, easily or economically. The simple design of the barrier allows the substitution of existing local materials for in-fill material in the construction of the barrier body. For example, sheet pile may be substituted for a panel. Rebar can replace connecting rods. Very large nuts or steel pipes cut into small sections can be welded to the panels to act as the connection between the connecting rods and panels. Where little or no in-fill material is used, the connecting rods can be oriented diagonally and secured with turnbuckles that can be locked down using double nuts. If sheet pile were attached or changed, the only design adjustment needed is the adaptation of the cover shell to the sheet pile shape.

Various intrusion detectors and deterrents may be attached to a barrier deployed using a preferred embodiment of the present invention so that it may be adapted readily to changing threats. Detectors and deterrents may include: wire mesh extensions; various detectors including pressure sensitive, motion, infrared, electromagnetic, and combinations thereof; surveillance devices using video, audio, RF and optical bands; and razor or whip wires. Further, anti-personnel deterrents such as pepper spray or o-chlorobenzylidene malononitrile (CS gas) could be activated by sensors. Military applications may use the same assortment as above and include detectors attached to lethal anti-personnel devices and shielded enclosures for use by heavily armed military personnel. In a commercial or residential setting, decorative plants may be added along the top. Further, in some applications where in-fill material is not used or used to fill only part of the void, parts of the panels used on sections of the barrier may be designed to be opened along one side for access to controls for deterrents or for storage of items such as tools, hoses, fertilizer, swimming pool equipment, etc.

Specific applications of a barrier deployed with a method of the present invention include vehicular barriers to deter terrorist car bomb attacks and a barrier rapidly constructed for use by the military in combat. The ability to construct a barrier using unskilled labor and to fill it with dirt, sand or stabilized earth (i.e., a bag of Portland cement is added to each cubic yard of dirt) makes it practical for military use where there may be limited availability of heavy equipment or concrete. Using a hardened filler, such as concrete or pumicecrete as formulated in U.S. Pat. No. 4,373,955, Lightweight Insulating Concrete, issued to Bouchard et al., the barrier is resistant to conventional munitions, such as bullets, shell shrapnel, and non-armor piercing shells. Further, a properly anchored barrier of appropriate size may prevent tracked vehicles from crossing the barrier unless an inordinate amount of time is taken to demolish it beforehand. Additionally, a barrier may be installed over existing barriers. This results in a barrier that did not incur the cost of demolition of an existing ineffective or damaged barrier but can use this existing structure as part of its "in-fill"

material for providing added strength. At the opposite end of its application spectrum, a barrier may be used to contain domestic animals and pets or even as a part of a fence with built-in storage for a residence in an urban setting.

DETAILED DESCRIPTION

Figure 2:
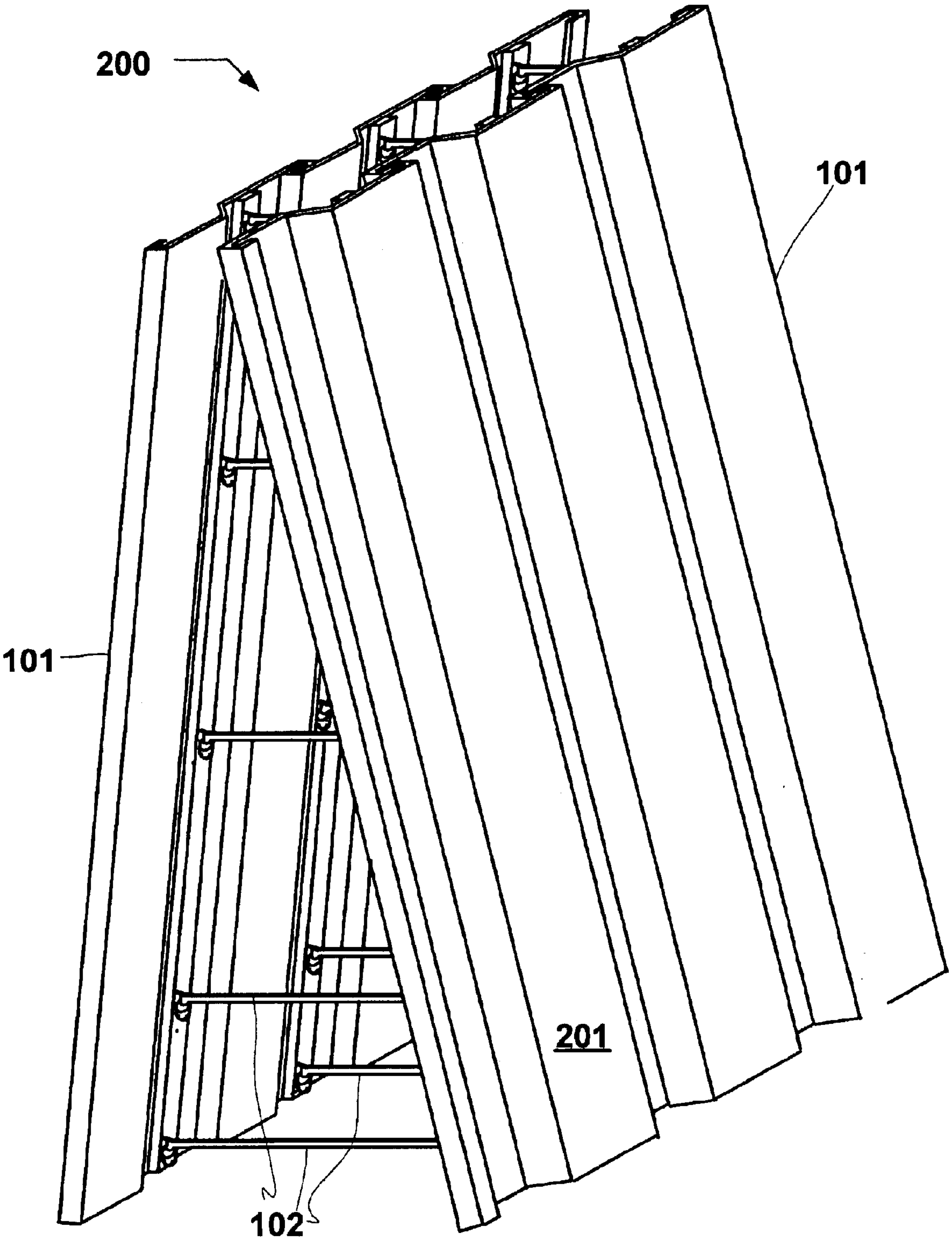
FIG. 2 shows a perspective of three sets of assembled panels (sections) of FIG. 1 without any of the various physical deterrents that may be attached at the top.

Preferred embodiments of the present invention may be used to promote any one or a combination of the following: safety, security, privacy, discipline, and order. A preferred embodiment of the present invention envisions a method of deploying a universal design for a durable, reliable, easily constructed and maintained access and egress control system, many components of which may be modular to meet varying user requirements. Refer to FIG. 2. One method employs a design featuring pairs of panels 101 of high strength material that are joined via simple connectors 102 to form an A-frame section 200, open at its top. These panels 101 are normally much wider than they are thick and longer than they are wide, i.e., at least forty times wider than thick and at least twice as long as wide. However, maximum dimensions are determined by shipping and handling considerations. For example, a homeowner would probably feel comfortable with a 1.8m×0.9 m (6 ft×3 ft) panel 101 of 6.25 mm (¼ in) thickness or less, while a construction company could handle a much larger array.

Figure 1:
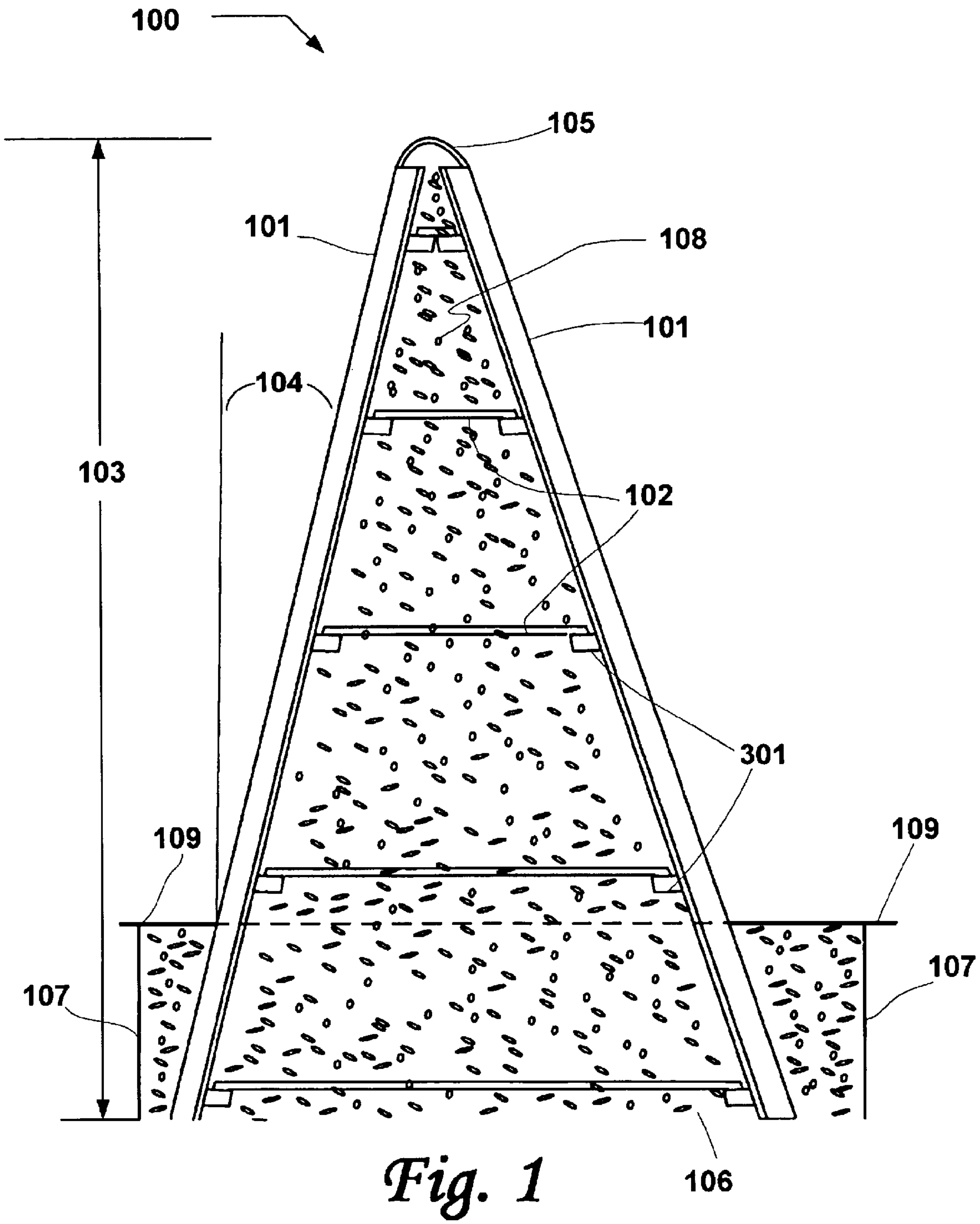
FIG. 1 is an end view of a barrier deployed using a method of the present invention that shows all components assembled and installed for a primary barrier application.

Refer to FIG. 1. A heavy-duty barrier designed to resist encroachment by all but heavy equipment and tanks may use steel panels 101 that are 4.6 m (15 ft) long by 0.9 m (3 ft) wide by 9.5 mm (⅜ in) thick, with a backing of in-fill material 108 such as concrete. A panel 101 of this size may be emplaced using four men if heavy equipment, such as a truck-mounted crane, is not available or the terrain is too rugged for deploying the equipment. To further insure against tipping this barrier, one may deploy at least 10% of its height 103 in a trench 107 dug for the purpose. For panels 101 that are 4.6 m (15 ft) high deployed at an international border, a trench 107 that is 0.9 m (3 ft) deep by 1.6 m (5 ft) wide suits the purpose, while backfilling the trench 107 with concrete provides additional strength. Further, in one embodiment in which it is important to deter climbing, a steep angle 104 is employed, e.g., inclining each panel 101 toward the other only 7° from the vertical provides a sufficient base width to deter tipping while also making unassisted climbing impossible. The panels 101 may be constructed of: steel, stainless steel, a metal alloy, aluminum, a polymer, a resin, a composite, a carbon fiber, a laminate of at least two of the above materials, and any combination thereof Further, they may be treated to inhibit environmental degradation; e.g., an anodized surface, paint, or other protective coatings may be applied.

Figure 3:
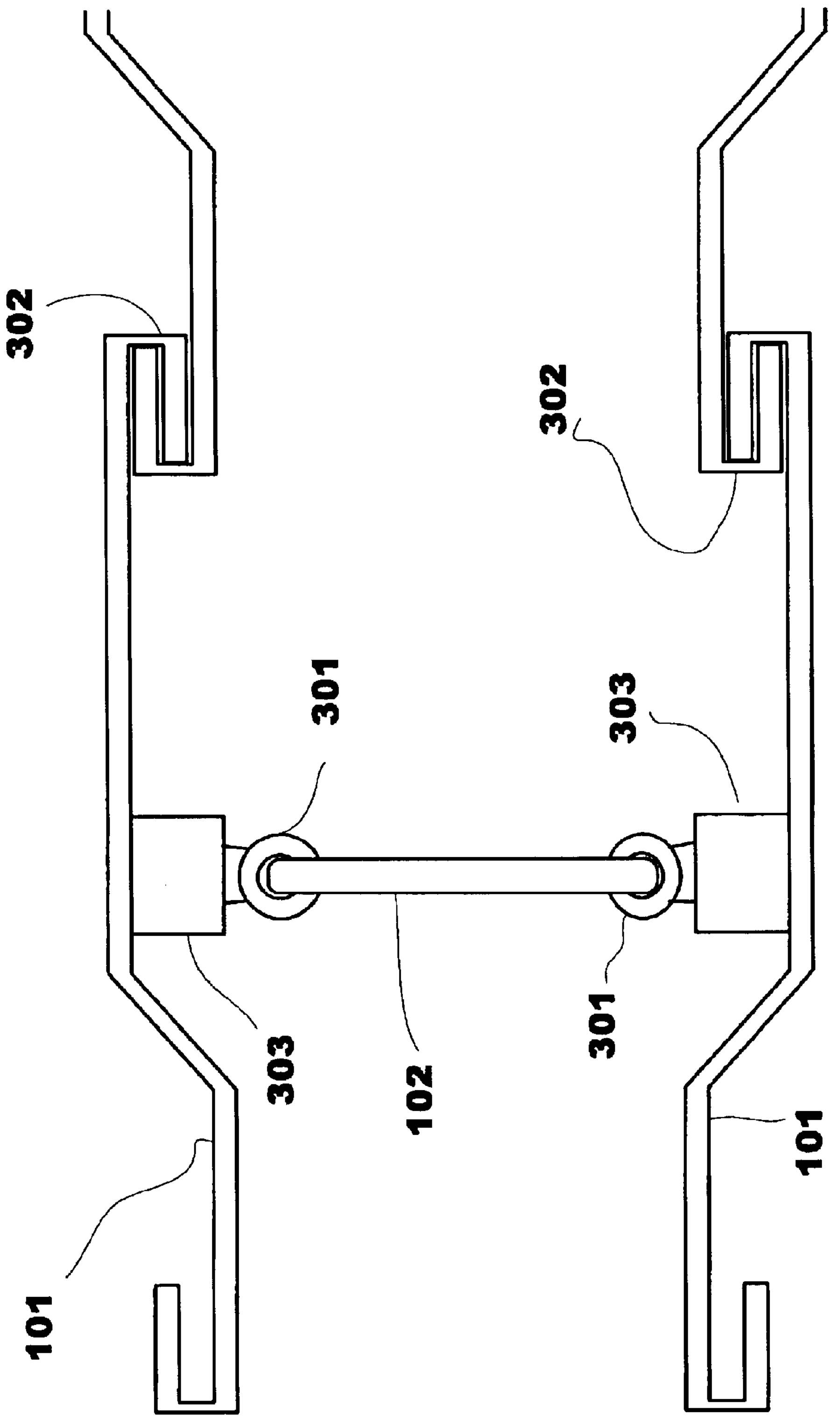
FIG. 3 provides a top view of the panels of a barrier deployed using a method of the present invention, providing details of the interlocking flanges and the connectors used.

For a high barrier, these panels 101 are placed with their longest dimension nearly vertical. Refer to FIG. 3. A series of these A-frame sections 200 are joined in an interlocking fashion, using interlocking flanges 302 at each panel's longest (longitudinal) edges. The connecting rods 102 may be simple metal rods bent 90° down (or adjusted as needed to accommodate individual installations) at each end to slip into a hole provided in a component 301 located on the inside of each of the panels 101. There may be several of these connecting rods 102 per section 200. depending on the strength requirements called out by the user. These rods 102 may be made of rebar in various diameters, sized to fit the job. They may fit connecting points 301 (slots or holes configured on the insides of the panels 101 that are reinforced by affixing a connecting bar holder 303 used to receive all of the connecting rods 102 and incorporating the component 301 having a slots or holes along a centerline of the panel 101.

Figure 10:
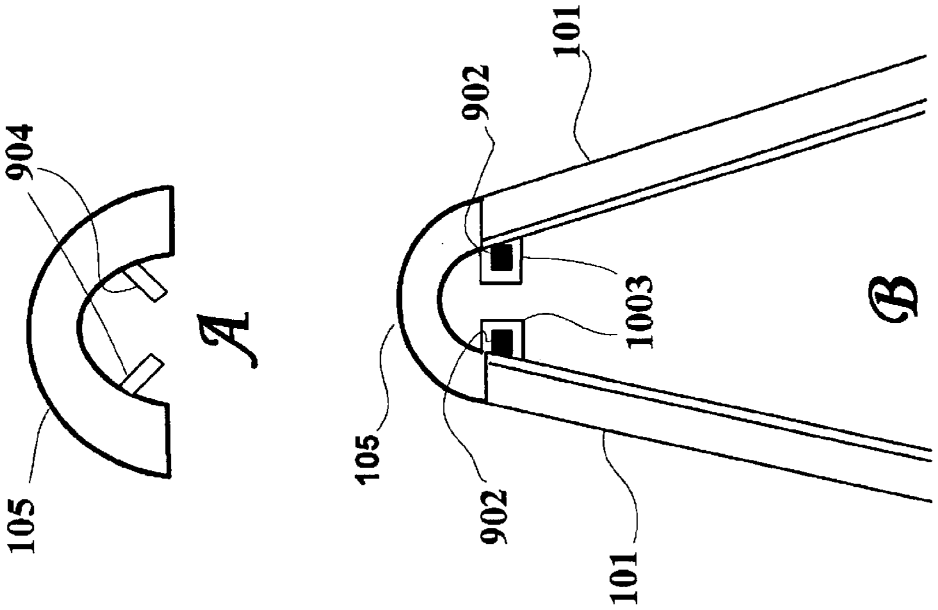
FIG. 10 illustrates a rounded cap that may be incorporated in a barrier deployed via a method of a preferred embodiment of the present invention.
Figure 13:
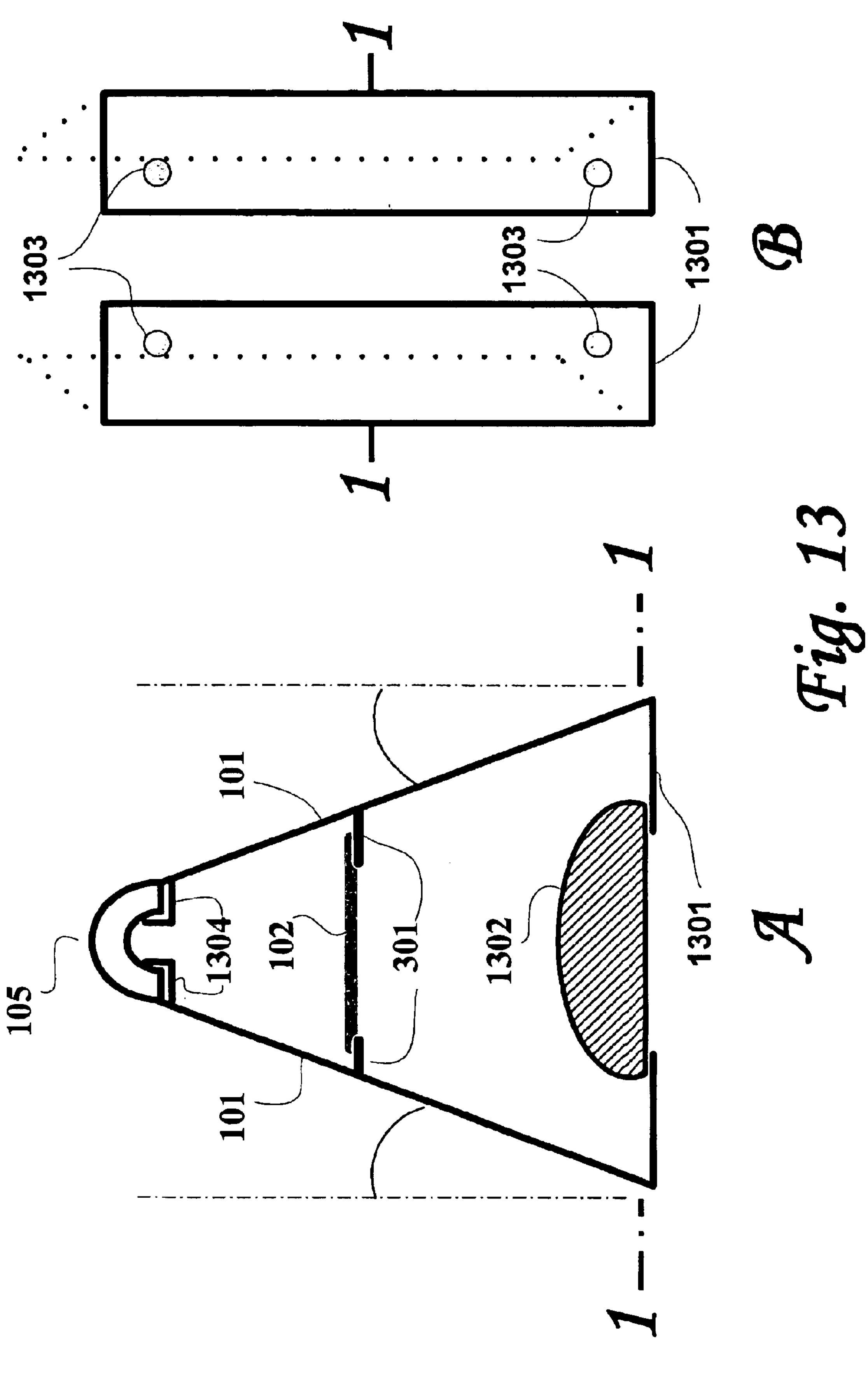
FIG. 13 is an end view of a section of a that may be incorporated in a barrier deployed via a method of the present invention designed to be freestanding for use in applications where it may be disassembled and transported to another site.

Refer to FIG. 1. One embodiment reinforces the A-frame sections 200 by filling at least part of the volume between the panels 102 with in-fill material 108. Use of indigenous material saves the cost of shipping while potentially providing local businesses with income. By inserting heavy-duty rods 102 across the panels 101, the tendency for the panels 101 to bulge out when the A-frame sections 200 are filled with heavy in-fill material 108 is minimized. The in-fill material 108 may consist of: a solidified mixture, concrete, pumicecrete, dirt, sand, rock, rip-rap, rubble, inorganic material, aqueous solutions, and any combination thereof. Refer to FIG. 13. For example, if to be used for a temporary application, such as an outdoor concert in a field, the barrier may be secured quickly by filling water bags 1302 internally positioned above a flange 1301 at the bottom of each section 200. Refer to FIGS. 9 and 10. Once filled, even partially with in-fill material 108, certain embodiments of the A-frame sections 200 are capped using either a narrow rounded cap 105 that inhibits any kind of purchase, should one wish to scale the barrier, or a triangular cap 901 that facilitates adding accessory detectors and deterrents (as shown in FIGS. 5–8, 16 and 17) near the top of the completed barrier. These caps 105. 901 may interlock with flanges 902 incorporated at the top ends of each of the panels 101 comprising each section 200, thus facilitating set-up, maintenance, tear down, removal, and modification or upgrading of the barrier.

Figure 12:
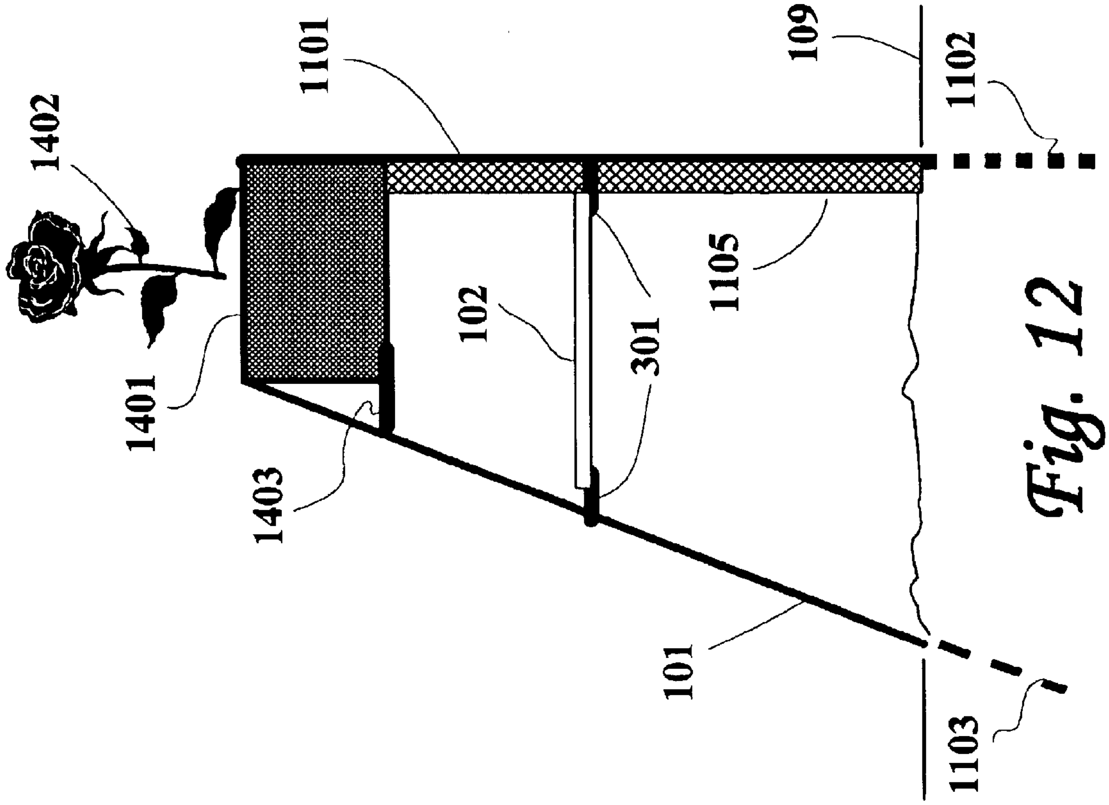
FIG. 12 is an end view of an embodiment such as represented in FIG. 11 having a top suitable for growing vegetation.

Refer to FIGS. 5D and 12. One alternative embodiment envisions no cap and the use of a soil mix 1401 at the very top of the in-fill material 108 for growing "unfriendly" vegetation 505, e.g., thorny or dense heavy shrubs, along the top of the barrier. Proper cultivation may require drain holes (not shown separately to be drilled in the upper sections of the panels 101 as well as irrigation hoses (not shown separately) running the length of the barrier's top.

At one end of the spectrum of barriers, one envisions panels 101 as short as only 0.9 m (3 ft) high by 0.3 m (1 ft) wide and a mere 1.5 mm (1/16 in) in thickness for easy installation by a consumer to contain toddlers and domestic climbing animals, such as house cats, in a portion of a back yard, for example, while also providing a small growing area at the top for a privacy shrub or flowers 1402. Another consumer application may provide for some sections 200 to slide or open vertically on hinges, providing access to the interior of the barrier along one side so that items may be stored within, such as garden tools, hoses, folding outdoor furniture, children's toys, etc. In this way the need for large separate storage sheds may be minimized or eliminated.

In remote locations, or less developed countries, one may find that making one's own panels 101 is necessary. The panel material may be sheet pile. Receivers 301 for bent rebar connectors 102 may include zinc-coated nuts, large washers, eyebolts, or short pieces of pipe welded to a bar, or multiple short lengths of bars, used as connecting bar holders 303 along the center of the inner side of the sheet pile panel 101. Should the sheet pile flange 302 (designed for vertical installation) prove to be unwieldy for easy installation of a neighboring panel 101 via horizontal attachment, a wedge (not shown separately) can be used to enlarge the flange 302 so that a horizontal tug on the inserted panel 101 will lock it to the existing section 200.

For ease of manufacture and control of inventory, one embodiment of the present invention envisions panels 101 that are identical for each installation and symmetric with respect to their two sets of parallel sides when turned 180° in the plane in which they are to be installed. To further deter climbing, a preferred embodiment of the present invention has those panel sides that face outward smooth and in the same plane, i.e., free of protuberances or indentures by which an individual or animal may obtain a purchase.

Certain auxiliary devices as shown in FIGS. 5–8, 16 and 17 may be mounted on some embodiments. In addition to those already listed, these include, but are not necessarily limited to: detectors, alarms, lighting, active deterrents, passive deterrents, and dye markers.

Detectors include those that detect disturbances by operating in ranges such as: audio frequencies, video frequencies, visible wavelengths, infrared wavelengths, ultraviolet wavelengths, radio frequencies, pressure, and combinations thereof.

Alarms may be silent, from a hard-wired or wireless system, to a central receiving station; audible such as a siren; sub-audible at levels that cause anxiety; visual, such as flood or strobe lights, and combinations thereof.

Lighting may be in the visible, infrared, or ultraviolet spectrum, and may be flood lighting, strobe lighting, scanned, and combinations thereof.

Passive deterrents may include, but are not necessarily limited to: wire mesh fencing, barbed wire, razor whip wire, concertina wire, and combinations thereof Active deterrents may include, but are not necessarily limited to: sensor-activated chemical sprays, sensor-activated munitions, electrically-charged wires, and high-powered electromagnetic devices.

Dye markers may include, but are not necessarily limited to: fluorescing stains facilitating unaided visibility at night, fluorescent dyes visible under ultraviolet light, and dyes visible by the use of infrared lenses.

A tailored barrier deployed in accordance with a method of the present invention is designed to meet a specific user's needs. A process of providing a tailored barrier may involve:

- defining a user's requirements;
- developing a design with built-in flexibility to meet the user's requirements;
- acquiring materials for producing the design;
- scheduling resources to build to the design;
- building the design in situ;
- acquiring resources to maintain the as-built structure, as necessary;
- updating the design as a user's requirements dictate, as necessary; and
- upgrading the as-built structure based on these updated needs and currently available technology, as necessary.

Of course, certain applications are generic to a large number of users or types of users, so that once this type of user has been identified and needs defined, this process need not be carried out for each fabrication and installation of a particular preferred embodiment of the present invention.

Figure 4:
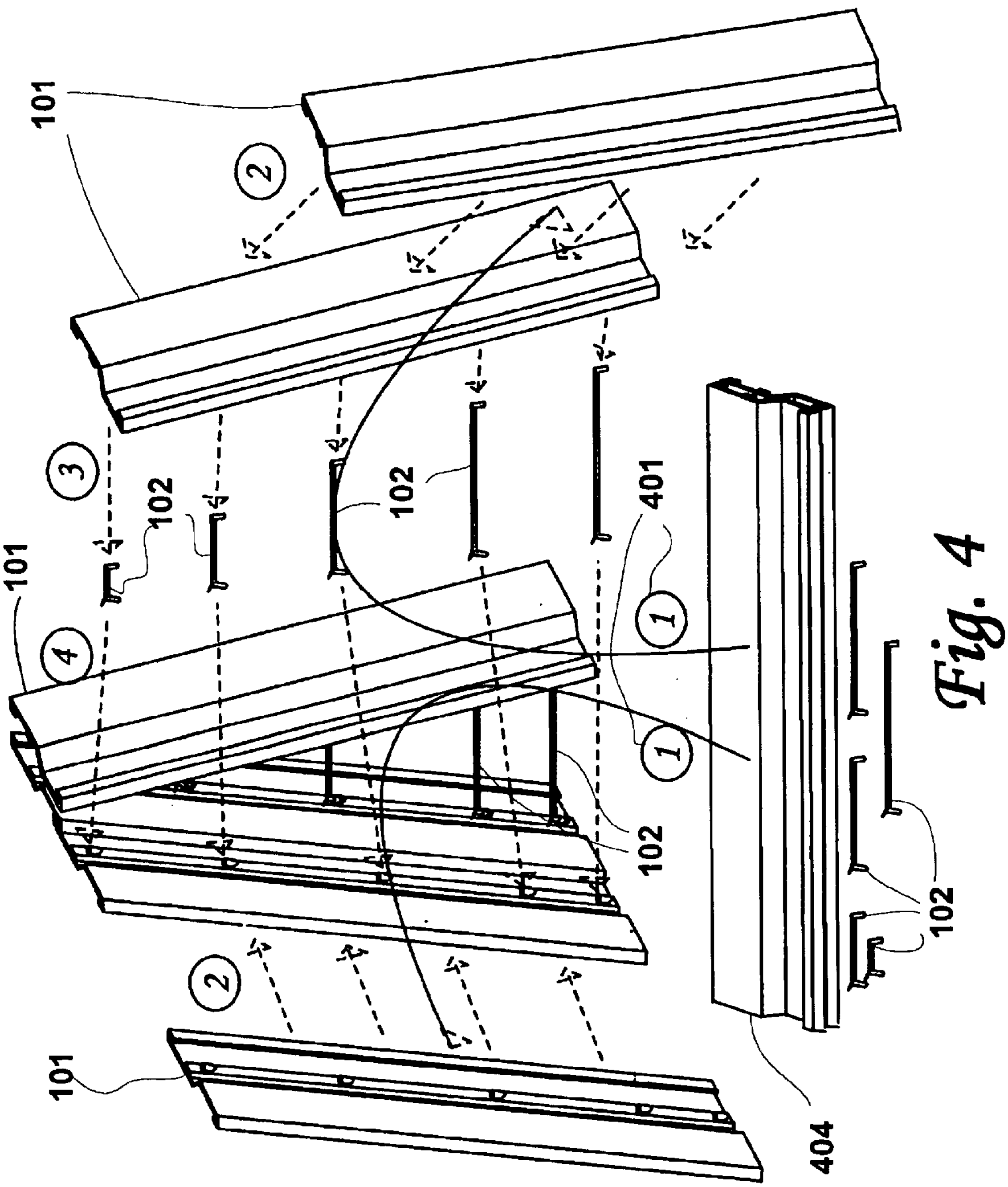
FIG. 4 depicts the components used for basic assembly of the frame used for a barrier deployed via a method of the present invention and illustrates the assembly steps for the panels shown in FIG. 2.

Refer to FIGS. 1 and 4. A method for comprising a preferred embodiment of the to present invention includes:

- uniformly grading the surface upon which a barrier is to be installed;
- acquiring and delivering necessary materials to a user's site to include panels 101 connectors 102, optional caps 105, 905 optional auxiliary devices, and in-fill material 108, as necessary,
- building the barrier section by section by:
  - vertically positioning two panels 101 along the axis that parallels edges of the panels 101 incorporating interlocking flanges 302, the sides of the panels 101 having receptors 301 facing opposite one another;
  - joining these panels 101 in a single A-frame section configuration 200 open at its top, by tilting the panels 101 toward each other and affixing appropriately sized connectors 102 to the appropriate receptor 301 on each panel 101;

building and interconnecting additional A-frame sections 200 to achieve a desired length by tilting individual panels 101 onto the started A-frame section 200 one at a time, pulling the new panel 101 horizontally to interconnect the flanges 302, and completing the connection of appropriate connecting rods 102 of the new two-panel A-frame section 200 before proceeding with the next section 200;

in one embodiment, filling the volume between the sections 200 at least part way to the top with in-fill material 108 using end panels (not shown separately) as necessary to contain the in-fill material 108 at intervals determined by physical constraints, and at the terminus of the structure; and in one embodiment capping the top with a cap 105, 901; and installing auxiliary devices as required by a user.

Preparing the surface may include placing panels 101 of the barrier in a trench 107 having a uniform grade. A nominal depth may be at least the first 10% of height 103. The trench 107 is backfilled after construction, which may include the option of filling at least part of the interior volume with in-fill material 108.

Figure 17:
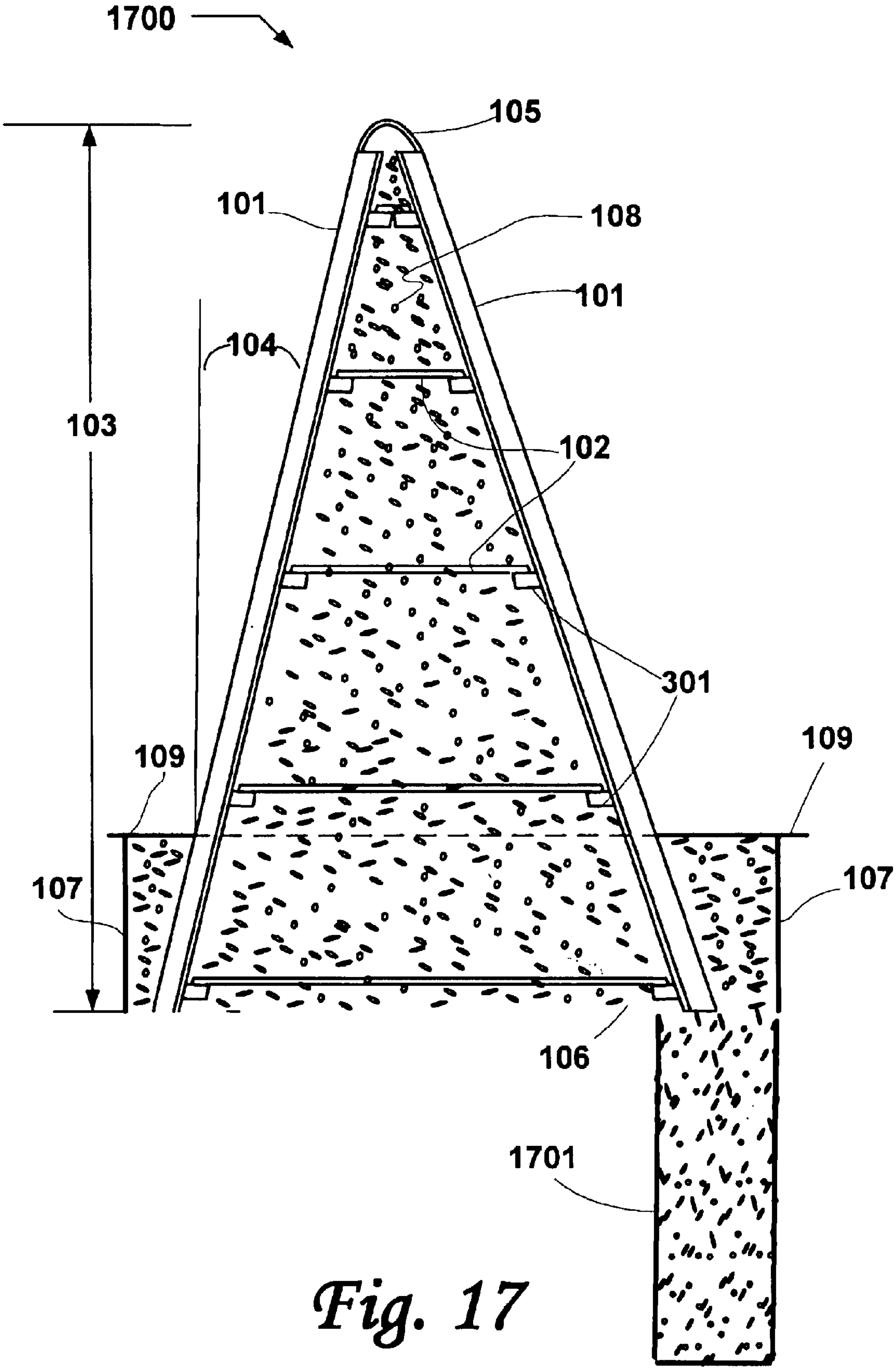
FIG. 17 is an end view of a barrier deployed using a method of the present invention that shows all components assembled and installed for a primary barrier application to include a buried wall for prevention of tunneling under the barrier.

Refer to FIG. 17 showing a barrier system 1700 that deters tunneling. An impermeable subterranean wall 1701 may be constructed vertically along the length of a barrier deployed in accordance with a method of the present invention and below its lowest point 106 of resting.

Refer to FIGS. 1 and 17. An embodiment of the present invention provides a method of deploying a barrier for impeding both unassisted human and surface vehicle access. Because the barrier is designed to result in an integrated whole that results in a structure that at any location is greater than the strength of any single component, this method provides the following benefits:

- provides a barrier, with optional subterranean foundation 107, that affords a reasonable response time to security personnel by resisting aggressive destruction by hand and power implements to include pneumatic hammers and related construction tools; prevents breach by a vehicle of approximately 4000 lb. traveling at speeds up to 80 Km/h (50 mph);
- prevents breach by tracked vehicles or heavy equipment from ramming through or driving over it when it is filled with in-fill material or anchored to underground walls or foundations, or any combination thereof;
- impedes human access by scaling, climbing, grappling, or similar means by use of smooth nearly vertically inclined wall surfaces, extreme height 103, and auxiliary deterrents placed near its top;
- impedes access by underground penetration due to embedding below ground level an underground wall 1701 that may be tied structurally to it, and combinations thereof;
- impedes disassembly via damaging or removing connection joints or embedded connecting rods 102 by shielding the joints with steel providing little or no purchase and using concrete or other material to fill the interior volume;
- facilitates quick installation by providing components that are modular and able to be manufactured easily, are able to be transported to the construction site in a compact configuration, and are easy to be assembled in situ using unskilled labor;
- facilitates assembly without the need to survey the installation site;
- provides an initial barrier even with no in-fill material 108 installed;
- serves as a barrier before concrete used as in-fill 108 is cured;
- withstands a significant amount of damage, while maintaining its integrity, before repairs are necessary;
- facilitates repair of voids quickly and easily by securing replacement cover plates or entire sections, e.g., securing by mechanically securing, welding, gluing or using other means of attachment, and filling the voids with concrete or other solidifying in-fill material;
- facilitates repair or replacement of entire sections from its protected side;
- makes use of commercially available materials such as sheet pile, fiberglass, advanced polymer composites, rebar, or pipe to construct or repair it; p1 accommodates interchangeable auxiliary devices for use as detectors and deterrents, for example:
  - force detector actuators such as mechanical lever arm or pressure plates that actuate alarms or deterrents;
  - noise sensors that upon breach of a pre-determined threshold activate alarm or deterrent devices;
  - ink spray disposed after a pressure detector or light sensor is activated, e.g., a coded ink spray that adheres to skin, remains for 30 days and may be read in either visible or ultra-violet light;
  - GPS to determine the location of an intrusion attempt;
  - razor wire and spikes attached as a physical deterrent;
  - triggered explosives using pressure or light sensors;
  - irritants, such as pepper gas, released upon a pressure or light sensor activating;
  - electric discharge with or without activation by a sensor such as a pressure sensor, further providing that if a continuous discharge is detected deactivation may be accomplished; and
  - provides for adjustable de-activation delays to be incorporated in any of the detectors or deterrents.

Refer to FIG. 1. In a preferred embodiment of the present invention, the configuration consists of panels 101 connected by horizontal rods 102 to form an A-frame configuration 100. These panels 101 may be interlocking, prefabricated carbon steel panels 101 as shown in profile and side views, respectively, in FIGS. 2 and 3 or panels 101 constructed of materials of similar strength and cost.

Figure 15:
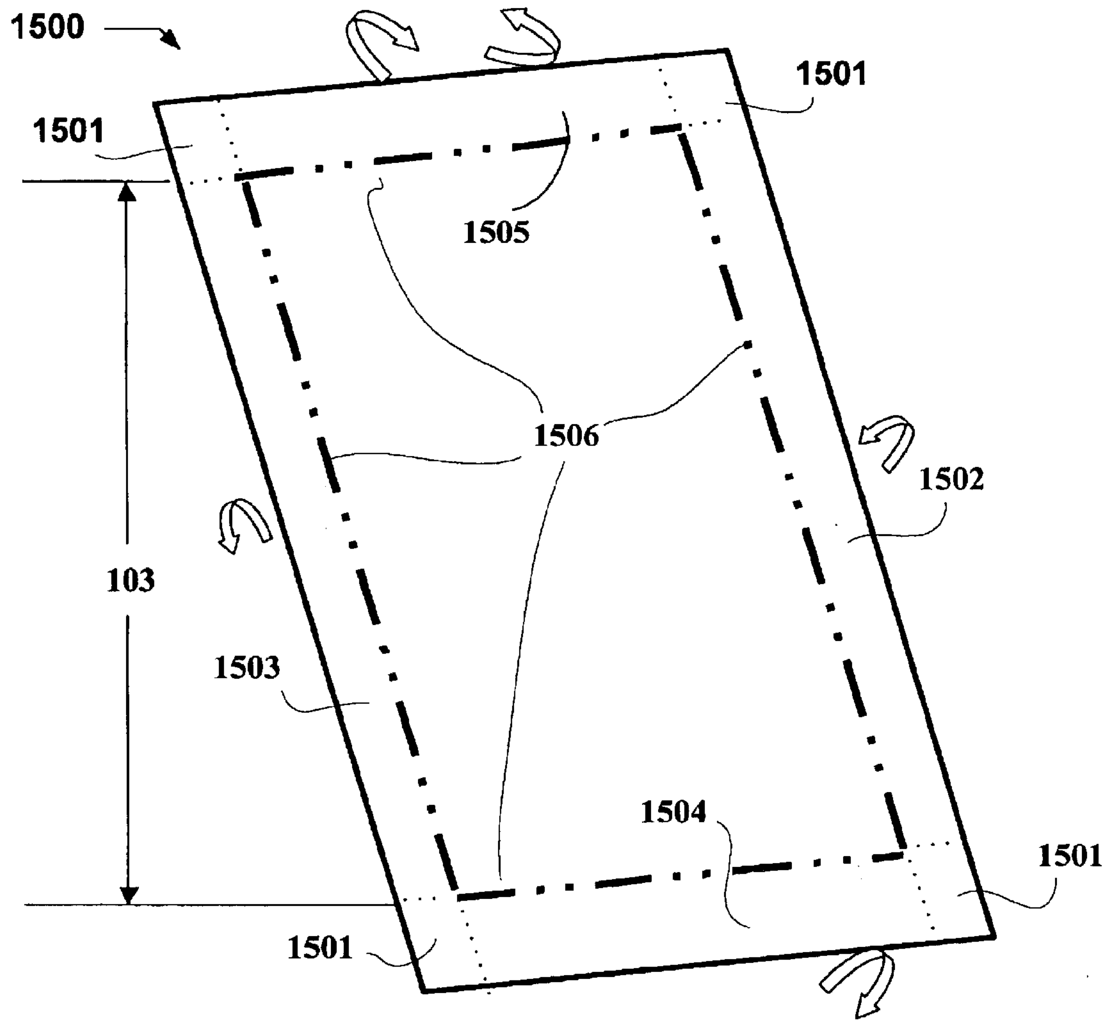
FIG. 15 depicts some of the details for forming a flat sheet of material into a panel used that may be incorporated in a barrier deployed via a method of the present invention.

Details for laying out a panel 101 to be fabricated for use with an embodiment of the present invention are depicted in FIG. 15. Shown is a flat sheet 1500 of suitable material such as sheet steel. Should the design call for top flanges 1505 and bottom flanges 1504 in addition to the interlocking longitudinal flanges 1502, 1503, these can be provided by following a design that calls for cutting sufficient material from the corners 1501 and bending the flat sheet 1500 at the heavy dotted lines 1506. Note that the final required height 103 must take into account the loss in height as a result of forming flanges 1505, 1504 along the top and bottom. Further, the top flange 1505 may be bent in either direction depending on whether a cap is to be secured internally or externally. The longitudinal flanges 1503 and 1502 are configured so that one 1503 is bent towards one face of the panel 101 and the other 1502 toward the other face, as depicted in FIG. 15, to facilitate interlocking the panels 101 while providing a smooth outer surface.

Refer to FIGS. 1 and 2. The panels 101 are connected on each side by internal connecting rods 102 that are hidden from transgressors by the outer skin 201 of the panels 101. The length of the panels 101 and connecting rods 102 can be adjusted for a barrier height 103 and angle of inclination 104 suited to a particular application. For installation along an international border, the primary barrier panels may extend 4.6 m (15 ft) in a direction inclined from vertical at an angle of 7°. This provides a tall barrier configuration 100 with steep smooth walls that inhibit the unassisted purchase of a would-be transgressor. The panels 101 may be steel of 6.5 mm to 9.5 mm (¼ to ⅜ in) thickness and treated to prevent rust. The connecting rods 102 may be steel of 2.5 cm (1 in.) diameter, that are bent at their ends to slide into the steel cylindrical connectors 301 fitted at intervals along the length of each of the panels 101. Rebar of 2.5 cm (1 in.) diameter, appropriately bent on each end, can be used as a connecting rod 102. The frame 200 is self-supporting, requiring a trench 107 dug wide and deep enough to stabilize it at its base 106. For example, a panel 4.6 m (15 ft) long, as inclined at 7 degrees, may be set in a 0.9 m (3 ft) deep ditch about 1.6 m (5 ft) wide. This yields a barrier about 3.4 m (11 ft) above, the top of the trench 107. Of course, a deterrent, such as wire mesh 502 or concertina wire 603, may be attached to the top of the structure to increase the height 103.

The trench 107 is dug the required length, breadth, and depth. Refer to FIG. 4 for the A-frame section 200 fabrication and installation. Emplacing the panels 101 in a trench 107, for example, one about 0.9 m (3 ft) deep, provides a solid foundation for a barrier deployed in accordance with a method of the present invention when in-fill material 108 is added. Embedding the panels 101 into the ground 109 provides significant resistance to tipping while also deterring tunneling under it. If a barrier deployed in accordance with a method of the present invention is installed in loose soil, repeated long term ramming or attack by heavy equipment or tracked vehicles may tip it. Refer to FIG. 17. Thus, as an option, an underground concrete wall 1701 or steel plate (not shown separately) may be installed under an A-frame section 200 to further anchor it and deter tunneling. This optional underground wall 1701 can be tied into the structure of the panels 101 or connecting rods 102 before in-fill material 108 is added. This underground wall 1701 or plate may be tied into the A-frame section 200 to provide greater stability. The underground walls 1701 may also be added after barrier installation.

This addition of buried anchoring structure 1701 makes it very difficult for heavy equipment or tracked vehicles to breach a barrier deployed in accordance with a method of the present invention. The underground wall 1701 can extend the barrier to any practical depth required and may incorporate intrusion detection devices (not shown separately) of its own. Tunneling is impeded since the transgressor must choose to either dig deeper, penetrate it, or defeat detectors and deterrents at its top. Each of these options provides additional time for emergency responders to address any attempted transgression, especially if detectors are located at both the top of the barrier and in the underground wall 1701.

The panels 101 and connecting rods 102 are brought to the site and placed in stacks 404 distributed along the length of the intended barrier on either side. Following a four-step process 401, the panels 101 are set in the trench 107 one across from the other and the connecting rods 102 are inserted into the respective cylindrical connectors 301. Additional panels 101 are set in the trench 107, connecting rods 102 inserted and interlocked with an installed set of panels 101. This continues for the length of the barrier. After several sections 200 are connected, the A-frame section 200 becomes an enclosure for in-fill material 108 such as concrete, pumicecrete, soil, or sand. Once the A-frame section 200 is set in place, the enclosure and the trench 107 are filled with the in-fill material 108. This provides optimum mass at the bottom 106 of the barrier where vehicular impact most likely will occur. If concrete or pumicecrete is poured into the enclosure, it can be left to cure with no need for surface finishing. Any attachments, such as deterrents or detectors, may be affixed to the top of the barrier by welds, epoxy, mechanical fasteners, or combinations thereof after the in-fill material 108 is emplaced.

The simplicity of the barrier design allows substitution or replacement of panels 101, connecting rods 102, and cylindrical connectors 301 by less expensive alternatives. Use of sheet pile, rebar, and nuts or pipe sections can reduce installation and maintenance costs. Sheet pile can be cut to the same length as the panels 101 and connections made at the same height. One problem with sheet pile is that the linkage process requires the sheet pile to be raised up and lowered into place. The flanges 302 for the sheet pile are shaped so that the flanges 302 will not overlap by pulling the ends together. This shortcoming can be overcome by using a wedge to widen the flanges 302 so they may be pulled together to overlap. A cover shell 105, 901 for a deterrent attached to the top can be constructed so it will fit any type or size of panel 101, i.e., made to fit over the widest part of any end configuration of the panels 101.

Refer to FIG. 3. A barrier deployed in accordance with a method of the present invention provides for an interconnected, overlapping detail 302 for the vertically oriented panels 101 so that there are no external connections needed to be made when installing the panels 101, providing only a smooth surface upon which a transgressor is unable to obtain a purchase. There is no way to disconnect the joint without lifting up one of the panels 101 against considerable friction and reaction forces. The homogenous solid in-fill material 108, such as concrete, provides an additional barrier to the weather and to intrusion since the concrete must be chipped away to provide access to each of the connectors 301. Stripping the panels 101 off a barrier is of little value if the barrier has a cementitious in-fill material 108 for this still leaves a "concrete pyramid" to scale.

Refer to FIGS. 1 and 3. A barrier deployed in accordance with a method of the present invention has a bottom portion 106 wider than the top portion. This provides a lower center of gravity to prevent tipping even if not filled with an in-fill material 108. This design feature allows the amount and type of in-fill material 108 to vary considerably. In a fixed location requiring security in which the threat may be vehicular ramming, concrete or pumicecrete is the preferred in-fill material 108, at least for the base 106. For quick assembly in remote locations or for protection from enemy personnel and light vehicles in a mobile situation, the in-fill material 108 can be local soil or sand. The quick assembly and ready availability of local in-fill material 108 provides a buffer against small arms fire while also resisting tipping due to a moderate impact.

EXAMPLE 1

Assembly of the panel section of a barrier deployed in accordance with a method of the present invention is illustrated in FIG. 4. The components used to construct the A-frame section 200 are trucked to the installation location. The components are comprised of the panels 101, the connecting rods 102, fiberboard (not separately shown) and any deterrents or detectors attached to the top. The panels 101 of this example are approximately 4.6 m (15 ft) long by 0.9 m (3 ft) wide by 9.5 mm (⅜ in.) thick but can be sized to widely varying dimensions to meet a user's specific application. Each panel 101 has a connecting bar holder 303 incorporating cylindrical connectors 301. The connecting bar holder 303 is affixed to the panel 101 via a method suitable to the material, e.g., for steel panels 101 the connecting bar holder 303 may be welded, whereas for polymer panels 101, the connecting bar holder 303 may be epoxied. Alternatively, a panel 101 may be manufactured with the connecting bar holder 303 and its cylindrical connectors 301 integral to the panel, i.e., the panel 101 may be formed in a shape that includes the connecting bar holder 303 and its cylindrical connectors 301 as a single unit panel, with no separate pieces representing the connecting bar holder 303 and the cylindrical connectors 301. The connecting bar holder 303 runs longitudinally along the center of each panel 101, providing a means for inserting and holding the connecting rods 102. Each section 200 of the barrier contains two panels 102 101 leaned towards one another and a number of connecting rods 102. In this example, five connecting rods 102 are used. The connecting rods 102 are sized to an appropriate length and located along the resultant A-frame section 200 to provide necessary support for the intended load. A triangular piece of foam board (not shown separately) may be fitted internally (vertically) to the A-frame section every five to ten sections to accommodate thermal expansion of in-fill material 108, such as concrete. The connecting rods 102 may be prefabricated to the correct size. Alternatively, if rebar is used to fabricate connecting rods 102, the rebar can be cut and bent to shape on site.

In preparation for installing the A-frame section 200, a trench 107 is due approximately 0.9 m (3 ft) deep by 1.6 m (5 ft) wide. If the connecting rods 102 are to be sized onsite, the rebar is cut and ends bent for the first section before emplacing the first set of panels 101. The first pair of panels 101 is tipped vertically on end from a pre-placed stack 404. All panels 101 are identical so obtaining a matching pair of panels 101 requires tipping two panels 101 on the stack 404 from opposite ends of the stack 404. Next, the panels 101 are set in the trench 107 with the connection bar holders 303 facing. The connecting rods 102 are attached from the bottom up between the panels 101 so the lower connecting rods 102 can be used as a step to reach the higher connecting rods 102. The connecting rods 102 may be welded or epoxied in place or simply wrapped with wire to secure them. The inclined panels 101 will now stand by themselves as an A-frame section 200. After emplacing the first section 200 additional panels 101 can be tipped off the stack 404 and attached to a standing section 200 by linking the overlapping flanged ends 302. Next, this added section's connecting rods 102 are attached. When an additional panel 101 is attached to a standing section 200, the additional panel 101 is pulled horizontally (parallel to the length of the barrier) to interlock the overlapping flanged ends 302 between panels 101. This interlocking of the flanged ends 302 may occur either before or after the connecting rods 102 are attached. The same procedure is repeated until several A-frame sections 200 are assembled as shown in FIG. 2. Additional rebar can be laid across the connecting rods 102 parallel to the length of the barrier, to provide greater reinforcement should the in-fill material 108 comprise a cementitious solid such as concrete or pumicecrete.

Upon emplacement of a suitable number of A-frame sections 200 (e.g., 5–10), in-fill material 108, such as concrete, pumicecrete, sand, rip-rap, dirt or other in-fill material 108 may be poured between the panels 101 and the gap between the trench 107 and the panels 101. Further, the outside of the A-frame sections 200 may be braced until such time as the cementitious in-fill material 108 cures. If concrete or pumicecrete is used it can be trucked to the location and pumped to direct the flow into a desired part of the interior volume created by the A-frame section 200 as well as to the below-grade portion, i.e., the gap, exterior to the A-frame section 200. In remote locations the concrete or pumicecrete may be mixed onsite.

The in-fill material 108 need not be homogeneous nor all of the same type. For example, concrete may be used as a base up to a certain height and fill dirt, rip-rap, or sand used above that level in any combination of layers thereof. The in-fill material 108 may be emplaced immediately after construction of a minimum length of A-frame sections 200, e.g., in-fill material 108 may be emplaced between as few as 5–10 A-frame sections 200. However, even with no in-fill material 108, as is possible with at least one barrier deployed in accordance with a method of the present invention, the barrier does provide immediate deterrence of the technologically unassisted transgressor. Once the in-fill material 108 has been added a cap may be placed over the tops such as a rounded 105 or triangular 901 cover shell.

Refer to FIGS. 9A and 10A. These cover shells 105, 901 fit loosely over the top of the barrier and may be connected to the panels 101, preferably on the protected side, by welding, gluing (epoxying), mechanical fasteners, and combinations thereof. Connecting bars 904 can be affixed to the cover shell 105, 901 and to the panels 101 via welding, gluing (epoxying), mechanical fasteners, and combinations thereof. Further, optional deterrents or detectors, or both, may be attached via various fastening methods to the panels 101 or cover shells 105, 901. These may be attached, preferably on the protected side, by welding, gluing (epoxying), mechanically fastening, and combinations thereof The detectors and deterrents are "custom installed" to accommodate each user's unique requirements.

Detectors, such as pressure sensors with mechanical levers, may be incorporated into the shell 105, 901 by incorporating hinges 601 at the top of the shell 105, 901. The deterrents may be attached to the shell 105, 901 at any time in the cycle, e.g., they may be pre-fabricated at the factory as part of the shell 105, 901.

Figure 5:
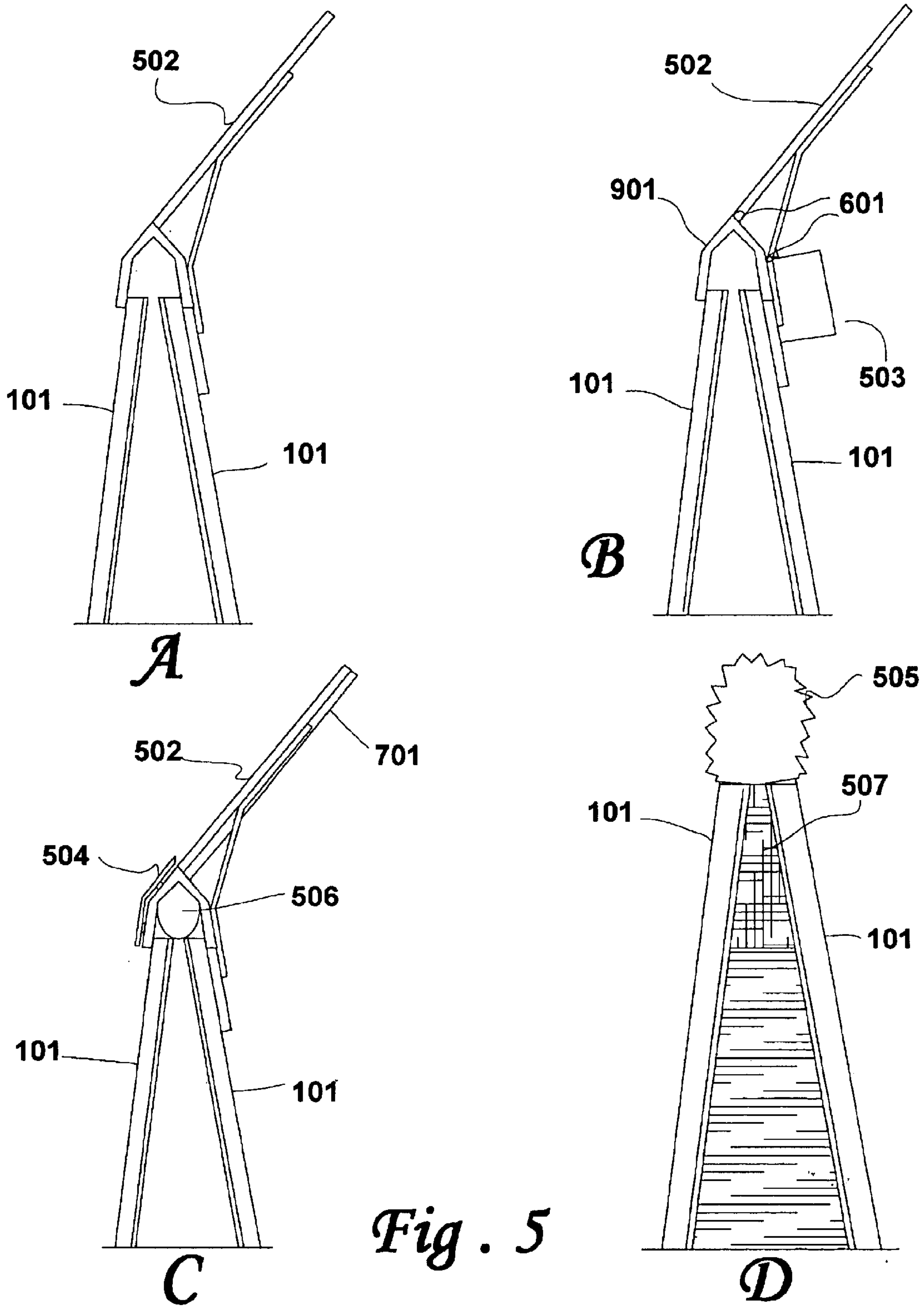
FIG. 5 illustrates passive deterrents that may be incorporated in a barrier deployed via a method of the present invention.
Figure 6:
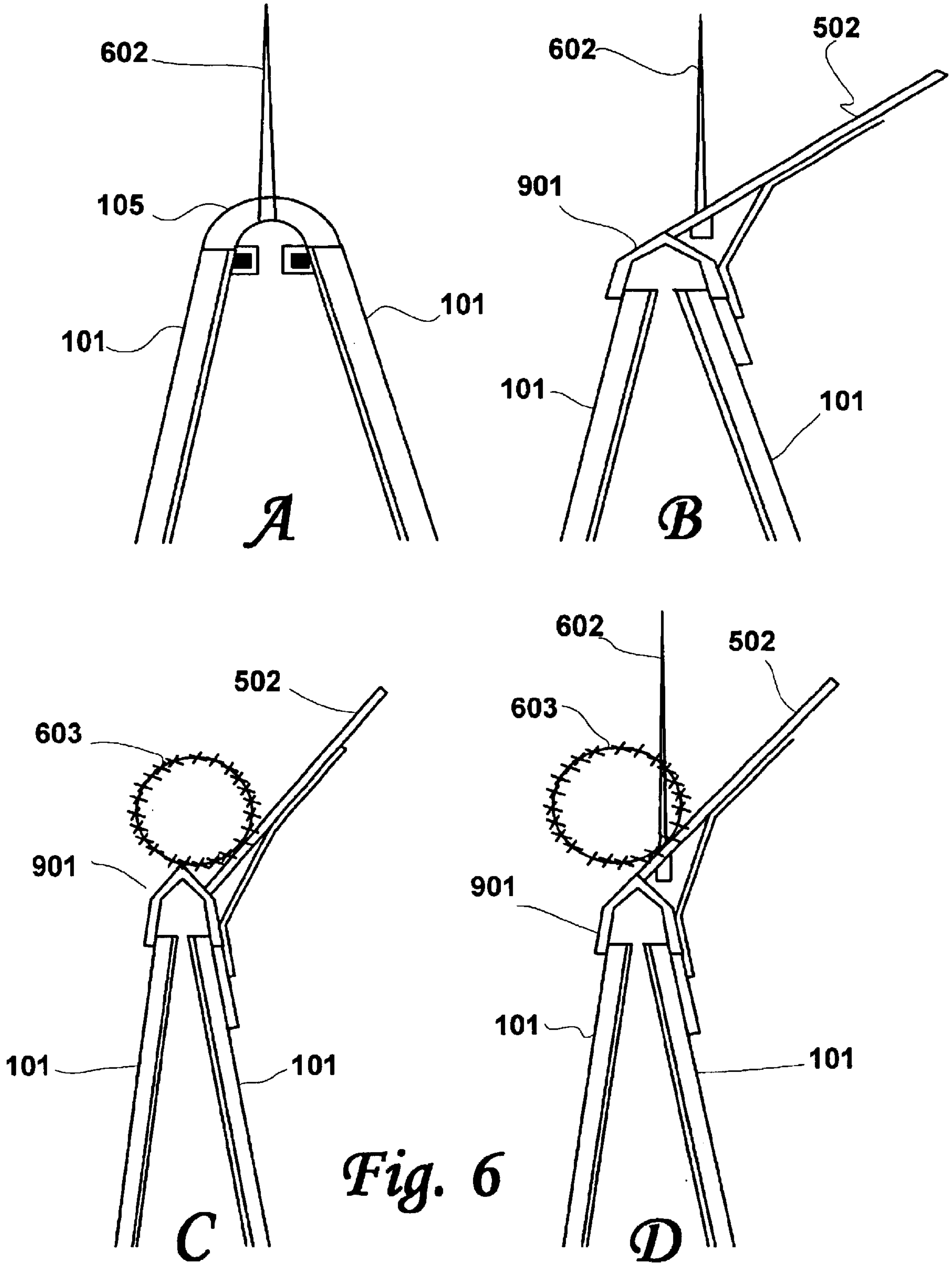
FIG. 6 illustrates aggressive deterrents that may be incorporated in a barrier deployed via a method of the present invention.

Refer to FIGS. 5 and 6. Deterrents may be classified as aggressive or passive. Passive deterrents (FIG. 5) serve to impede a transgressor by inconvenience or situational physical discomfort. Examples of passive deterrents are:

- a round cover shell 105 as shown in FIG. 10A that inhibits trespass by providing no purchase;
- a wire mesh extension 502 as shown in FIGS. 5A–C on a triangular cover shell 901 that forces a transgressor to lean backwards at the top while the flush fit between the shell 901 and the wire mesh extension 502 provides no purchase until the transgressor reaches the top of the mesh 502 at approximately 4.0–4.3 m (13–14 ft) above grade and the angled extension 502 over the protected side of the barrier makes climbing back from the protected side exceptionally difficult;
- sensors 503 as shown in FIG. 5B, such as motion, audio, optical, infrared, or pressure detectors, that may activate alarms or lights and notify security forces;
- dispensing devices 701 as shown in FIG. 5C activated by a pressure sensitive plate 504 that may be affixed to the cover shell 105, 901 or the wire mesh extension 502 for spraying from a reservoir 506 a non-toxic semi-permanent dye that may be transparent normally but fluoresces under ultraviolet light or illuminates at infrared wavelengths thus enhancing security forces night vision capabilities, or is transparent when first exposed to the air, but reacts with human skin to fluoresce enabling unaided detection by security forces;

heavy vegetation 505 such as shown in FIG. 5D, preferably thorny or stinging flora such as pyracantha, nettles, or both, in lieu of a cover shell, in which the top 0.6–0.9 m (2–3 ft) 507 of in-fill material 108 may be soil with drainage provided by holes drilled in the panels 101.

Aggressive deterrents impede transgressors by causing physical harm or discomfort. FIG. 6 illustrates four aggressive deterrents: razor whip wire 602 (shown embedded in a round cover shell 105 in FIG. 6A) that oscillates violently when disturbed, lacerating the transgressor; a combination of razor whip wire 602 and a wire mesh extension 502 shown in FIG. 6B; a combination of concertina or razor wire 603 and a wire mesh extension 502 shown in FIG. 6C; and a combination 604 of all three 502, 602, 603 shown in FIG. 6D.

Figure 7:
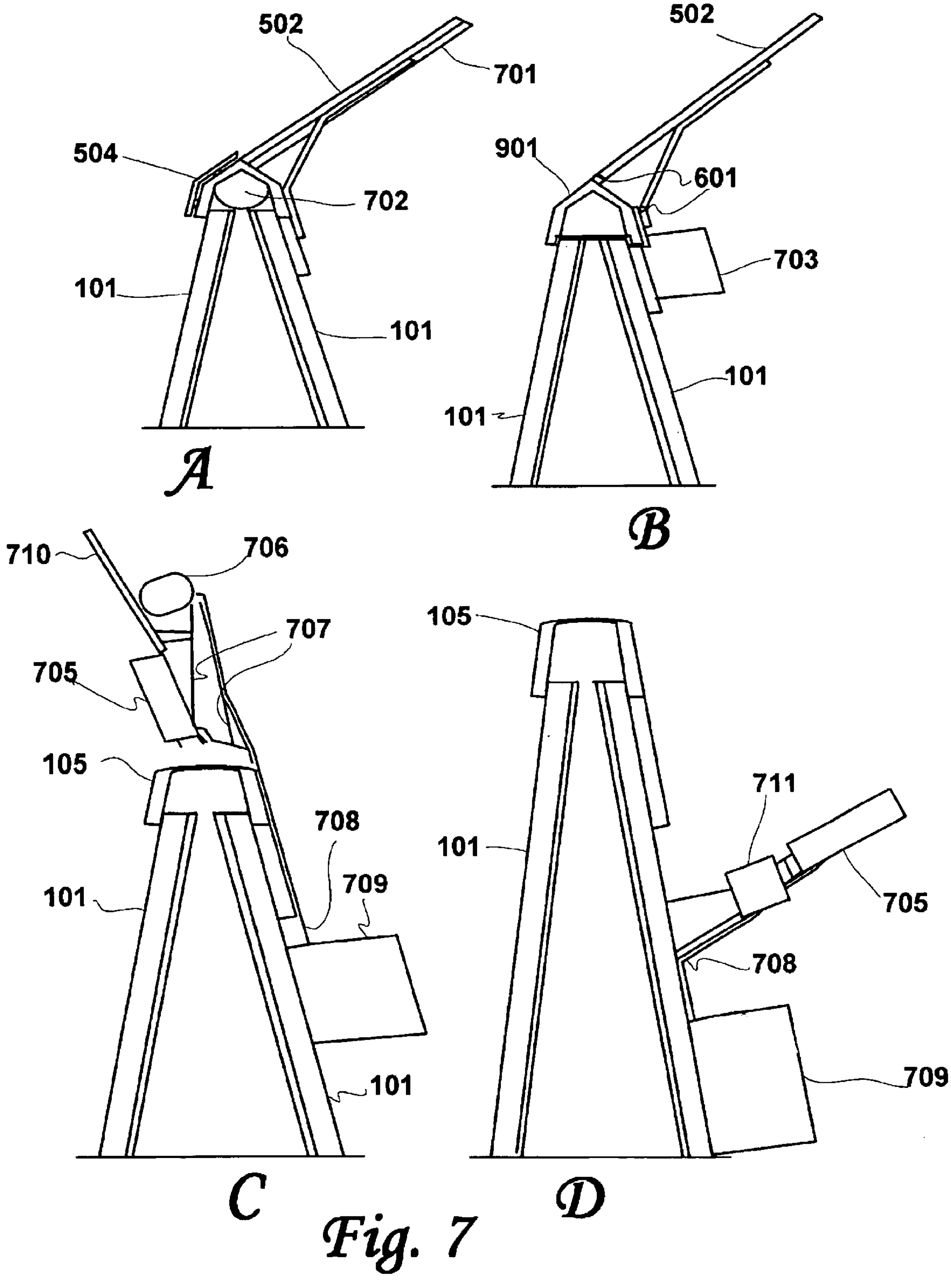
FIG. 7 illustrates lethal aggressive deterrents, coupled with sensors, which may be incorporated in a barrier deployed via a method of the present invention.

FIG. 7 illustrates other aggressive deterrents. Non-lethal deterrents may include a pepper (or other disabling gas) sprayer 701 as shown in FIG. 7A, the container 702 for which is housed within the cover shell 901, or an electric fence (not shown separately), the power source 703 of which is activated by pressure on the hinges 601 as shown in FIG. 7B. Lethal deterrents may include mines 705 that are linked to intrusion detectors, such as motion detectors 711 as shown in FIG. 7D or video camera 706 mounted on support brackets 707 to view through plexiglass 710 and linked via hardwire 708 to controls 709 as shown in FIG. 7C that are positioned to trigger mines 705 as shown in FIGS. 7C and 7D upon a transgressor attempting to cross the barrier.

Figure 8:
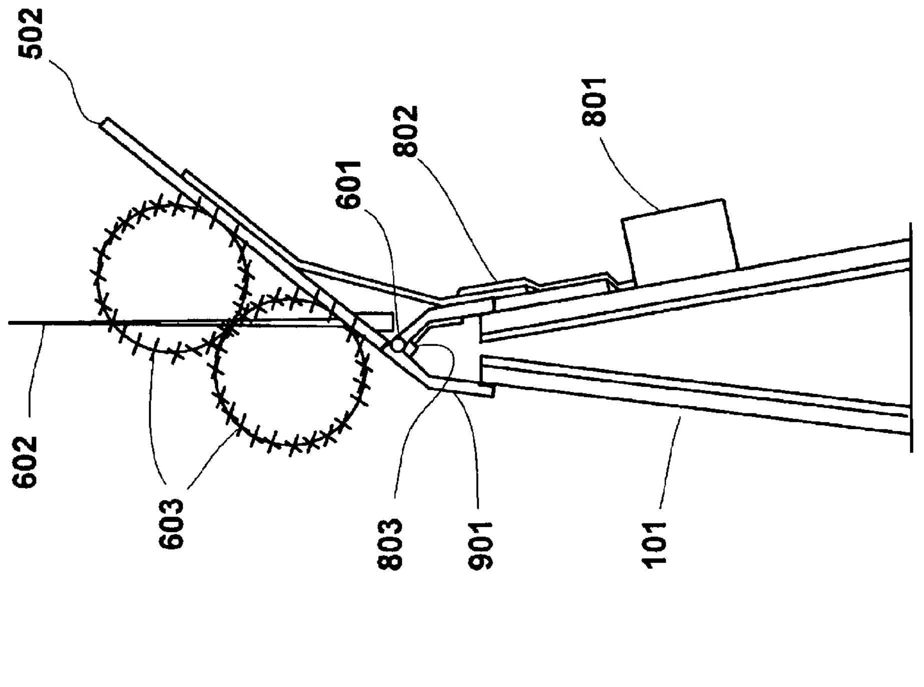
FIG. 8 illustrates a non-lethal deterrent system combined with sensor and alarm that may be incorporated in a barrier deployed via a method of the present invention.
Figure 9:
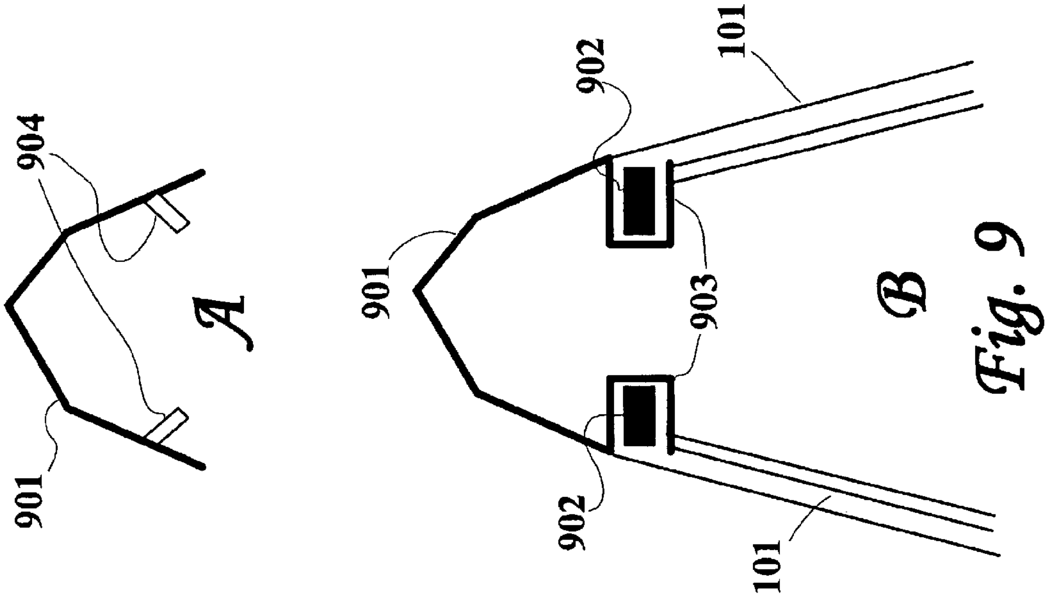
FIG. 9 illustrates a triangular cap that may be incorporated in a barrier deployed with a method of the present invention.

FIG. 8 shows a combined non-lethal deterrent system with sensor 803 activated by pressure on a hinge 601 and an alarm 801. A wire mesh extension 502 is attached flush with a triangular cover shell 901. Razor whip wire 602 is attached every 10–15 cm (46 in.) in the wire mesh extension 502 so repairs to or replacement of the razor whip wire 602 can be made without removing the cover shell 901. Razor wire 603 is emplaced on the wire mesh extension 502 and is supported in place by the razor whip wire 602. Any attempts to trespass require the removal of the razor wire 603 and the razor whip wire 602. Razor wire 603 can be added or replaced by tossing extended rolls of razor wire 603 over the end of the wire mesh extension 502 and letting it catch on the razor whip wire 602. Maintenance can be performed behind the wire mesh extension 502 without exposing personnel to the danger on the other side, i.e., personnel obscured from direct observation are unable to be targeted accurately with thrown objects or advanced weaponry.

Figure 16:
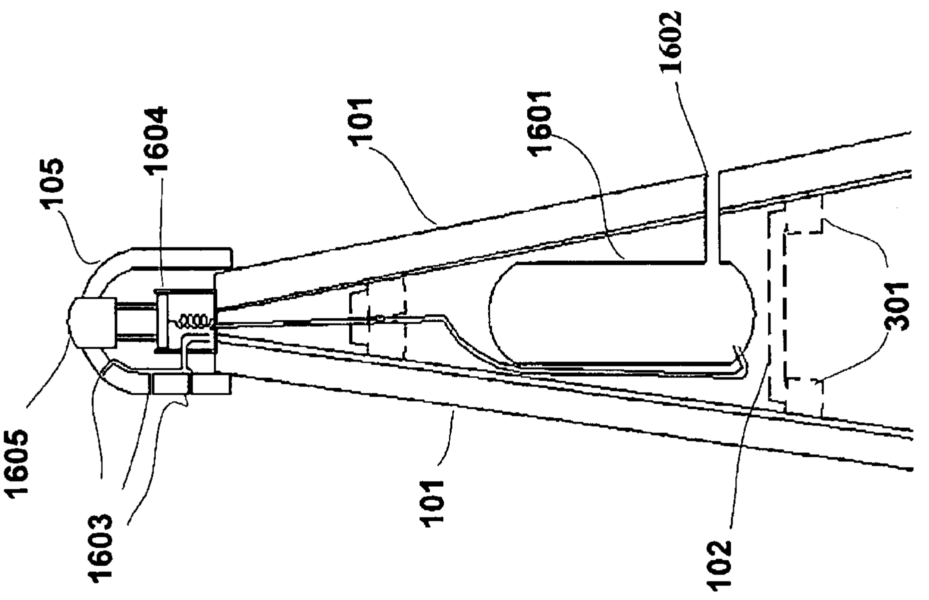
FIG. 16 depicts a detail of a marker system that may be incorporated in a barrier deployed with a method of the present invention.

FIG. 16 illustrates a marker system that may be used to identify a transgressor should the barrier be breached in a location having the marker system installed. A pressurized container 1601 containing an appropriate dye, such as an ultraviolet (UV) marker spray, is installed in the interior of the barrier. The container 1601 may be accessed on the "friendly" side of the barrier for maintenance at an access point 1602. The mechanism 1604 that activates the marker system is operated by a simple spring-activated button 1605 that is depressed by a transgressor breaching the barrier. Upon activation of the mechanism 1604, a marker spray that is not visible to the naked eye is emitted from a number of dispersing locations 1603. Transgressors can be identified passively by illuminating them with an appropriate wavelength, e.g., "black light" in the UV range will detect a person having been sprayed with a UV marker.

FIG. 9B illustrates a triangular cap that may be used with an embodiment for which one wishes to install accessories. The cap 901 is intended to slide onto flanges 902 provided on the top ends of the panels 101 for that purpose. It will be appreciated that the configuration of the cap 901, specifically the portion providing the mating surface 903 for mating with the panel flanges 902, may be formed from a single sheet of material, e.g., sheet steel may be bent to the shape in a simple and inexpensive process. FIG. 10B illustrates the same configuration for a rounded cap, providing a mating surface 1003 similar to that provided for the triangular cap 901. Further, caps 901, 105 formed in this manner need not be made in lengths to cover just one or two sections 200. Similar to forming "continuous gutter," they may be made in a piece that is as long as the barrier itself in some cases. To provide additional security, the cap 901, 105 may be fastened to the flanges 902 from the inside using suitable means such as machine screws.

EXAMPLE 2

Figure 11:
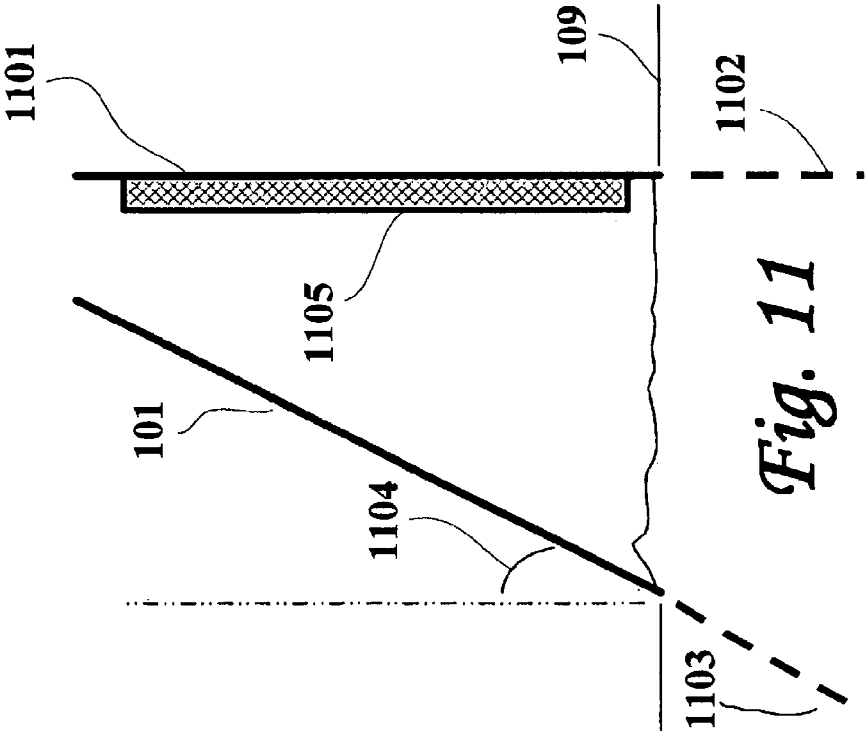
FIG. 11 illustrates an end view of an embodiment that may be incorporated in a barrier deployed via a method of the present invention in which the angle of inclination is different for each of the panels comprising a section.

Another embodiment may provide a barrier suitable for use by the urban homeowner. Further, the sections need not be inclined towards each other at the same angle. FIG. 11 provides an end view of a basic configuration that might be used. FIG. 11 is designed to show panel orientation only, showing parts of the panel 101, 1101 installed below ground 109 with certain details omitted such as the connecting rods 102, caps 105, 901, and optional accessories. One panel 1101 may be installed in a vertical orientation along a property line of one's neighbor. To provide some additional rigidity the thin panel 1101 may have backing 1105 installed continuously or at pre-specified intervals. The other panel 10 1 may be installed in an orientation 1104 similar to that of Example 1. Although FIGS. 11 and 12 shows the panels 101, 1101 having partially buried sections 1102, 1103, other means of securing them may be used as are detailed below.

FIG. 12 illustrates an option building on the concept of FIG. 11 that permits some vegetative ornamentation 1402. Supplementing the design shown in FIG. 11 with additional detail, a connector 102 and its fittings 301 in the panels 101, 1101 are illustrated. Instead of a cap 105, 901, this embodiment uses a planter 1401 for growing flowers 1402. The planter 1401 may be secured with tabs or other sturdy supports 1403 further using the backing 1105 on the panel 1101 to support one side. Again, this design need not require partially burying the panels 101, 1101 as is discussed below.

EXAMPLE 3

A barrier deployed in accordance with a method of the present invention may be used as a temporary solution to a user's needs. For example, outdoor concerts, construction zones, police crime scenes, and special athletic or recreational activities may need controlled access. FIG. 13 provides a configuration that does not require trenching or otherwise burying the panels 101. For simplicity, the configuration of Example 1 is shown, although it is possible to use a configuration in which both panels 101 are not inclined towards each other at a similar angle from the vertical. The panels 101 are provided with extended flanges 1301 at their bottom portion. These flanges 1301 may have holes 1303 pre-drilled for insertion of stakes or pins (not separately shown) that can be driven into the ground much like tent stakes. Should this be unacceptable because of the condition of the surface (concrete) or a desire not to disturb the surface, weights 1302 can be used to cover the flanges 1301. These can be anything that suitably covers the flanges 1301 (shown in FIG. 3B in a view cut through 1—1 in FIG. 3A) with sufficient weight to provide necessary stability for the intended use. Examples, include filled sand bags, water-filled polyethylene bags sold by swimming pool supply houses, scrap metal, etc. To facilitate assembly and disassembly, the cap 105 may simply slide on over some flanges 1304 in the panels and be connected internally via quick connect plastic fittings (¼ turn) (not separately shown) similar to that used to fasten plastic pieces of automotive trim to potions of an automobile.

EXAMPLE 4

Figure 14:
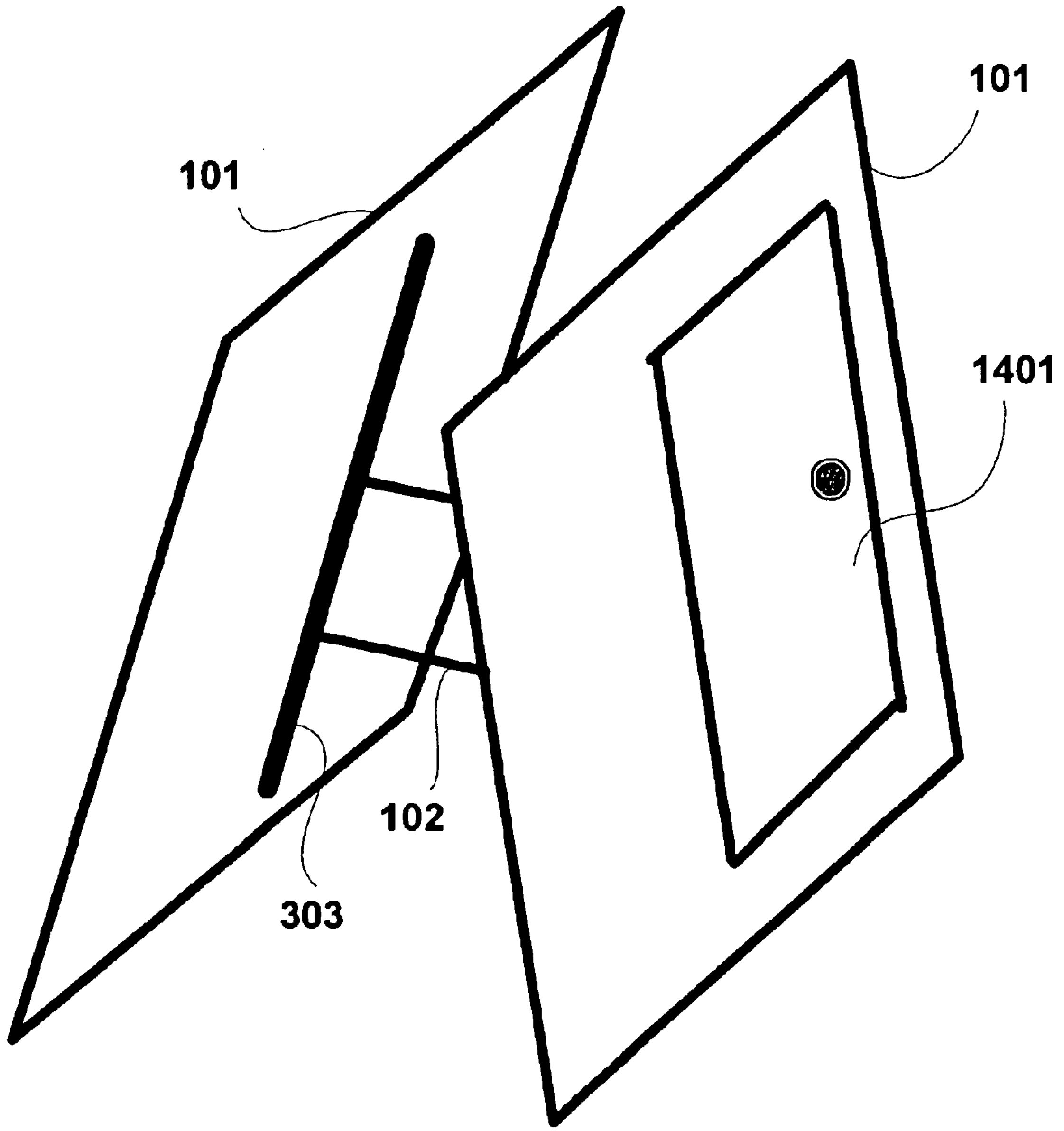
FIG. 14 depicts a pair of panels, the braced connections thereto, and an access door in one of the panels, using the center reinforcing bar to mount a hinge for the access door that may be incorporated in a barrier deployed via a method of the present invention.

Refer to FIG. 14. In addition to use as a barrier, a barrier deployed in accordance with a method of the present invention may be used for storage. Additionally, should accessories be used in a more complex embodiment, any power or connections that support the accessories may be supported by an internal arrangement to which it would be advantageous to attain ready access. For this reason, a barrier deployed in accordance with a method of the present invention may also include an access door 1401. The door 1401 may be secured by appropriate locking means (not separately shown), including deadbolts, padlocks, electronic locks, or combinations thereof, its complexity and strength depending on the use made of the barrier. Because many embodiments will be of considerable height (1.9 m (6 ft) or more), it can be appreciated that, even with the interior partially filled with in-fill material 108 for increasing security, there remains considerable room for storage of material that may be useful to either the home owner or the security professional in working around the barrier. For example, the homeowner may wish to store hoses, garden tools, children's toys, and even folding outdoor chairs and tables within his "fence." By doing so, he may be able to obviate the need for a separate storage shed or rental space for seasonal items. The security professional, on the other hand, may need to access the underside of the top of the barrier to maintain, repair, or upgrade accessories installed there. Perhaps spares and tools for maintaining or repairing the barrier may be stored inside as well.

The above descriptions should not be construed as limiting the scope of the invention but as mere illustrations of preferred embodiments. Embodiments of the present invention can be applied to a wide variety of uses in a wide range of scale. For example, small sections, with little or no in-fill material, of approximately 1.9 m (6 ft) in height may be used to fence in domestic animals, such as house cats, that otherwise may be able to scale a conventional fence. At the other end of the spectrum, an international border or prison may be protected using sections of 4.6 m (15 ft) or more in height with a significant portion embedded below ground and a significant amount of in-fill material held in place by steel panels of 6.25 mm–9.5 mm (¼–⅜ in.) thickness. The scope shall be determined by appended claims as interpreted in light of the above specification.

We claim:

1. A method for constructing a barrier having multiple sections, comprising:

building a first section by:

providing a first and second panel, each having a first side and a second side, first and second edges along a longest dimension, third and fourth edges along a next longest dimension, said panels described by a length, a width and a thickness, said second side of each said first and second panel provided with at least one receptor, both said first and second edges of each said first and second panel being flanged in opposing directions;

providing at least one connector to be affixed to said at least one receptors;

orienting said first and second panels so that respective said second sides of said panels face each other;

orienting said facing first and second panels vertically with respect to said panels' longest dimension along a line on which said barrier is to be constructed, tipping the top of said vertically oriented first and second panels one toward the other so that said at least one connector may be fit into said at least one receptor on each said panel;

fitting said at least one connectors into said at least one receptor on each said first and second panels, said connector serving at least to keep said first and second panels from abutting;

wherein a first section having the shape of an A-frame is constructed;

building a second section similar to said first section and interconnecting said second section with said first section by:

providing third and fourth panels of similar construction and dimension to said first and second panels;

providing at least one connector to be affixed to said at least one receptors of said third and fourth panels, said connector serving at least to keep said third and fourth panels firm abutting;

interlocking an appropriate edge of a third panel by fitting said third panel to said first panel along said flanged edge having the longest dimension of said first panel of said first section and pulling said third panel roughly horizontally with respect to the surface upon which said first section rests;

interlocking an appropriate edge of a fourth panel by fitting said fourth panel to said second panel along said flanged edge having the longest dimension of said second panel of said first section and pulling said fourth panel roughly horizontally with respect to the surface upon which said first section rests; and fitting said at least one connectors into said at least one receptors on each of said third and fourth panels, wherein additional length may be added to said barrier by fitting additional sections to said barrier in the manner of fitting said second section.

2. The method of claim 1 further attaching at least one cap to the top of said barrier.

3. The method of claim 1 further comprising at least partially filling with material the space created internally in each said section through use of said connectors.

4. The method of claim 1 further disposing said barrier in a trench for at least the first ten percent of the height of said barrier, wherein said trench is backfilled after constructing said sections.

5. The method of claim 1 further comprising installing auxiliary devices near the top of said barrier.

6. The method of claim 1 further comprising providing a subterranean wall constructed vertically along the length of said barrier and below the lowest point of resting of said barrier sections.

* * * * *